United States Patent
Szukat

(10) Patent No.: US 10,647,086 B2
(45) Date of Patent: May 12, 2020

(54) MULTILAYER LAID SCRIM

(75) Inventor: Klaus Szukat, Parcent (ES)

(73) Assignees: Fritz Scholten, Sausalito, CA (US); Klaus Szukat, Parcent (ES)

( * ) Notice: Subject to any disclaimer, the term of this patent is extended or adjusted under 35 U.S.C. 154(b) by 655 days.

(21) Appl. No.: 14/123,528

(22) PCT Filed: May 31, 2012

(86) PCT No.: PCT/EP2012/002302
§ 371 (c)(1),
(2), (4) Date: Dec. 3, 2013

(87) PCT Pub. No.: WO2012/167884
PCT Pub. Date: Dec. 13, 2012

(65) Prior Publication Data
US 2014/0106636 A1 Apr. 17, 2014

(30) Foreign Application Priority Data
Jun. 4, 2011 (EP) .................................. 11004560

(51) Int. Cl.
*B32B 5/02* (2006.01)
*B29C 70/08* (2006.01)
(Continued)

(52) U.S. Cl.
CPC ............ *B32B 5/028* (2013.01); *B29C 70/083* (2013.01); *B29C 70/226* (2013.01); *B32B 5/10* (2013.01); *B29B 11/16* (2013.01); *Y10T 442/10* (2015.04)

(58) Field of Classification Search
CPC ..... B29C 70/083; B29C 70/226; B32B 5/028; B32B 5/10; Y10T 442/10
See application file for complete search history.

(56) References Cited

U.S. PATENT DOCUMENTS 5,972,810 A * 10/1999 Gabrisch ............... B29B 15/122
428/112
6,187,409 B1 * 2/2001 Mathieu .............. B28B 19/0092
428/119

(Continued)

FOREIGN PATENT DOCUMENTS

DE 10253300 A1 6/2004
EP 2033754 A1 3/2009

(Continued)

OTHER PUBLICATIONS

Textile Glossary definition of nonwoven, Celanese Acetate, dated 2001.*

*Primary Examiner* — Elizabeth C Imani
(74) *Attorney, Agent, or Firm* — Michael Soderman

(57) ABSTRACT

The invention relates to a multilayer laid scrim (10, 15) for sheet-like or 3-dimensional high-strength components, consisting of a structure made of a multiplicity of plies of multilayer laid scrim for sheet-like or 3-dimensional high-strength components, consisting of a structure made of a multiplicity of plies made of glass fibres, synthetic fibres, aramid fibres and/or carbon fibres. In order to prevent fan-out of the individual fibres or filaments of the multilayer laid scrim used, it is provided according to the invention that in certain regions structural reinforcement elements (11, 16) are embedded at least into one ply, and/or between at least two plies, of the multilayer laid scrim. Said embedding here can take place over an entire area or else only in the regions which are exposed to a subsequent deformation. The structural reinforcement elements (11, 16) help to generate greater coherence between the individual fibres of the laid scrims, thus preventing fan-out, for example in the edge region.

12 Claims, 3 Drawing Sheets

(51) Int. Cl.
    *B29C 70/22*           (2006.01)
    *B32B 5/10*            (2006.01)
    *B29B 11/16*          (2006.01)

(56)     References Cited

U.S. PATENT DOCUMENTS

| | | |
|---|---|---|
| 2005/0257887 A1 | 11/2005 | Tsotsis |
| 2012/0237707 A1* | 9/2012 | Beraud .................. B29B 11/16 428/36.3 |

FOREIGN PATENT DOCUMENTS

| | | | |
|---|---|---|---|
| FR | 2954356 A1 * | 6/2011 | ............. B29B 11/16 |
| GB | 2225277 A | 11/1989 | |
| WO | 9944810 A1 | 4/1999 | |
| WO | 2011113752 A1 | 9/2011 | |

* cited by examiner

MULTILAYER LAID SCRIM

CROSS REFERENCE TO RELATED APPLICATIONS

This application is the U.S. national stage of International Application No. PCT/EP2012/002302 filed on May 31, 2012, and claims the benefit thereof. The international application claims the benefit of European Application No. EP 11004560.6 filed on Jun. 4, 2011; all applications are incorporated by reference herein in their entirety.

BACKGROUND

The invention relates to a multilayer laid scrim for sheet-like or 3-dimensional high-strength components comprising a structure made of several layers of glass fibers, synthetic fibers, aramid fibers and/or carbon fibers.

Multilayer laid scrims are required for fiber composite components that distinguish themselves, in particular, by the fact that they have hardly any weight and, moreover, outstanding mechanical characteristics. Depending on the application area, this could involve simple UD scrims (unidirectional scrims), but also MD scrims (multiaxial scrims). The multiaxial scrims have the advantage vis-a-vis the unidirectional scrims that a strength, especially tensile strength, not only exists in the axial direction, but also crosswise to the axial direction. Long-fiber reinforced components are an important application area for scrims. The composition and structure of the scrim in interplay with the production technology and the matrix material that is used essentially determine the characteristics of the subsequent component in the form of a composite component. The special advantage here is the fact that there is a higher level of use of the specific characteristics of the above-mentioned fibers with a simultaneous reduction in the production costs and therefore the component costs.

Glass fibers, synthetic fibers, aramid fibers or carbon fibers that are arranged in the form of individual filaments next to one another are used to manufacture the UD scrims, and they are held together with an adhesive fiber mesh, for instance, before further processing is done. In addition, the possibility exists to hold the individual filaments in place in an improved way by sewing them.

Various techniques can be used to manufacture the multiaxial scrims. A well-known process provides for further UD scrims to be laid at an angle of 45 degrees, for example, onto a work table or a 0° position of a UD scrim in connection with this. To this end, a cutting-and-laying technique is used that supplies the UD scrims at an angle to the intended direction of transport and cuts the UD scrims to their specific length in the edge area. These processes are relatively complex and require a great deal of time, so cost-effective production is not possible.

For the above-mentioned reasons, a proposal is put forth below to put the UD scrims together by winding them around a plane to form a multiaxial scrim. At least two or more UD scrims are fed into a winding device for this purpose; the winding device can rotate around the longitudinal axis. Alternatively, the possibility exists to move the supply rolls of the UD scrims around a fixed winding table.

A process for manufacturing a multidirectional scrim web is disclosed in the published patent application DE 10 2005 000 115 A1, for instance; two further webs at an angle to the direction of extension are wound around a scrim whose fibers are aligned in the direction of extension of the scrim web in this process. The winding process leads to a multiaxial scrim that can be subsequently used as a multilayer laid scrim for sheet-like and 3-dimensional high-strength components. Carbon fibers can be used as a preference to manufacture the UD scrims, but the possibility also exists to manufacture UD scrims from glass fibers, aramid fibers or other synthetic fibers.

DETAILED DESCRIPTION

Basically, the invention relates to components made of composite fiber materials with a flat design, which are available from sewn or unsewn scrims (UD or MD) with various fiber directions, for instance ±45 degrees or ±45 degrees and a 0° position. The UD or MD scrims are reformed into fabrics, woven materials, knit fabrics, tiles or mats to the extent that they can be fed into another processing step. Adhesive fiber meshes or adhesive nets with the appropriate design are used as a preference so that the individual filaments or fibers stay in their intended position during the further processing; the use of full-surface adhesive films is also envisaged to position the individual fibers.

Furthermore, the possibility exists to provide for targeted sewing of the individual fibers. Sewing always leads to the drawback, however, that possibly large gaps will arise at the sewing location that could bring about a weakening of the component to be manufactured. On the other hand, though, sewing will also ensure that synthetic resin can penetrate into all of the layers of the individual fibers and air bubbles etc. are ruled out in part there because of that. There is also close bunching of the filaments because of the sewing threads, though, which prevents penetration of resins, for example. The aim of the further processing is always important here to clarify the decision as to whether an adhesive fiber mesh is desired as the case may be or sewing of the individual fibers.

To manufacture the high-strength components, the multilayer laid scrims are pressed in a mold that is subsequently filled out with a synthetic resin, preferably a two-component resin. The synthetic resin penetrates into the gaps of the UD scrims or MD scrims, and that leads to a strong connection of the fibers that are used with the required mechanical characteristics. Since the prepared multilayer laid scrims have to be pressed into an appropriate mold, especially in the case of 3-dimensional components, it has to simultaneously be ensured that the arrangement of the individual fibers remains in the intended shape and that all of the surfaces of the 3-dimensional components are evenly covered with a multilayer laid scrim to the extent possible. Compared with technical textiles in the form of fabric, scrims in a sewn or unsewn form are only conditionally suitable for draping. Depending on the thickness of the draping, the lain structure can be ripped open or fanned out and the spacing of the individual fibers can consequently be changed. In individual cases, that could lead to the even distribution of the individual fibers no longer being ensured in the edge area, for instance. The individual fibers have a tendency towards the formation of fairly large gaps here because of the displacement of individual fibers, for instance, that are subsequently merely filled in with synthetic resin. These gaps can have a negative effect on the mechanical characteristics depending on the stress on the 3-dimensional component that is manufactured.

In all of the previously known methods, the fibers or filaments in the laid structure that have already been laid can, depending on the thickness, be ripped open and separated in the side-by-side arrangement when there are instances of draping at problem areas, so stability cannot be ensured to an adequate degree. To preclude the problem that was described, this invention is based on the problem of providing a new type of multilayer laid scrim that avoids the known drawbacks of the prior art and prevents a fanning of the laid fibers.

To solve the problem, the invention envisages structural reinforcement elements embedded in at least certain areas, at least in a layer and/or between at least two layers of the multilayer laid scrim. Further advantageous design forms of the invention follow from the sub-claims.

The basic objective of this invention is to maintain the adhesion of the theoretically straight-line, adjacent filaments or fibers and to fix them in place in the prefabricated arrangement during further mechanical processing. In particular, slippage of the individual fibers in an edge area is consequently avoided. Displacement of the individual fibers is additionally prevented in a supportive way with the aid of the structural reinforcement elements so that the mechanical characteristics can consequently be maintained.

This invention additionally provides for structural reinforcement elements to be embedded between the individual layers of the UD or MD scrims while using multilayer laid scrims that are preferably made of UD or MD scrims. The structural reinforcement elements can be directly connected to an individual layer or arranged between two layers, for instance, and serve here to additionally connect the individual fibers of an individual scrim to one another, whether a UD or an MD scrim, and to therefore stabilize them. If a reshaping process of this multilayer laid scrim is necessary during further production, whether via pressing or in some other form, a situation in which the individual fibers of the scrim fan out and are spaced fairly far apart from one other is prevented with the structural reinforcement elements. The structural reinforcement elements ensure that the spacing of the individual fibers of the scrim will remain nearly the same; a significant increase in the mechanical characteristics of the multilayer laid scrim can be additionally be achieved on the whole with the special arrangement of the structural reinforcement elements. This special advantage always has an effect when the scrim is draped. Draping in this context is understood to mean that the individual scrims are pressed into an appropriate mold to manufacture multi-edge components, for instance. An especially important issue here is that the scrims are able to be brought into their final form via pressing; simultaneously fixing the individual filaments or fibers in place in a relative position vis-a-vis one another ensures that a sufficient number of fibers is available in the area of the draping zones so that adherence can be kept to the desired mechanical characteristics. The structural reinforcement elements could only be provided for an individual layer, as an example, or all of the layers could be equipped with structural reinforcement elements as an alternative. Furthermore, the structural reinforcement elements can be embedded in an adhesive film that is arranged as an intermediate layer between the UD or MD scrims.

As a starting material for the production of high-strength components, the scrims are used in the form of by-the-yard goods or piece goods that can be used, for example, as multilayer fiber complexes in aeronautics and space travel, in shipbuilding, in the construction of wind power systems and railway vehicles, in containers, and especially in the automotive industry and the production of utility vehicles. Several of these individual layers lead in connection with this to the multilayer laid scrim that can be filled in with synthetic resin after the pressing, in order to consequently produce sheet-like or 3-dimensional, high-strength components.

The structural reinforcement elements are preferably arranged without orientation on the layers or between the individual layers to ensure the characteristics of the 3-dimensional, high-strength components to be manufactured in all conceivable alignments. The structural reinforcement elements consequently provide for sufficient cohesion of the individual fibers in their non-oriented position and can make an additional contribution to strength depending on the material of the structural reinforcement elements. An additional isotropic distribution of the structural reinforcement elements could be important here in the production of 3-dimensional, high-strength components to achieve the same mechanical characteristics in every section for the 3-dimensional component. An isotropic distribution leads to the situation in connection with this that the mechanical characteristics will be developed in a constant way in every section of the component and a direction of stress.

The possibility exists, depending on the purpose of the application, to arrange for the structural reinforcement elements to be distributed over the entire plane of the individual layers or for selected areas of the layers to be equipped with structural reinforcement elements. If a sheet-like component that also only extends over one plane is being manufactured, as an example, it is sufficient if the structural reinforcement elements are arranged so as to be evenly distributed over the entire plane without an orientation. If 3-dimensional edged or arched components have to be manufactured, on the other hand, there can be a deviation from this arrangement of the structural reinforcement elements. As a preference, the structural reinforcement elements could only be arranged in the areas that are exposed to significant stresses after the production of the component. That could be the case in the edge area, for instance, which has to fulfill the same mechanical characteristics as the sheet-like areas of the individual components.

On the other hand, the material could be reduced in a targeted way with an appropriate selection of the areas that are to be equipped with structural reinforcement elements to ensure the required increase in strength solely in the areas that are exposed to particular stress.

The draping zones in which the structural reinforcement elements have to be arranged, i.e. in the shaping arch and/or edge areas in which the individual fibers could otherwise very easily slip or fan out and consequently not fulfill the mechanical characteristics, are among the special areas of the 3-dimensional components. Adherence to, or even an increase in, the mechanical characteristics is specifically ensured in precisely these areas, however, with the aid of the structural reinforcement elements.

Based on the special nature of the structural reinforcement elements and their arrangement, a further design form envisages that the structural reinforcement elements are designed to be in a straight line, curved, wavy or arched to consequently deviate from the predominant direction of the individual fibers of the UD or MD scrims and thereby ensure that the structural reinforcement elements will not be in an arrangement that corresponds to that of the predominant direction.

As a preference, the structural reinforcement elements will be comprised of random fibers, random-fiber coatings or random-fiber films. Random fibers are understood to mean nearly any kind of fibers that do not have a straight-line course. The fibers of the structural reinforcement elements could be made up of nearly any type of fibers, for instance mineral fibers, animal fibers, plant fibers or chemical fibers. Random-fiber layers, random-fiber coatings via spraying or random-fiber fleece can, moreover, be made of carbon fibers, preliminary-stage fibers of carbon fibers, ceramic fibers, glass fibers, polymer fibers (e.g. aramid) and their mixtures.

The starting product for the random fibers could also be a recycled material, for instance from pyrolysis (combustion) or a sovolytic (chemical) process, in addition to "new fibers". A design of the random fibers with an adhesive coating, e.g. in a spray coating, is possible here, as well as fibers in binding resins. The spray coating can take place by first spraying the surface that is to be coated with random fibers with a selected liquid or powder-type material, then spraying on a random-fiber coating and, if it turns out to be necessary, applying a liquid once again.

The random fibers that are used could participate so as to increase the strength in light of the required strength of the 3-dimensional components, or they could merely serve the purpose of keeping the individual fibers in the desired position.

Alternatively, the random fibers could be designed in such a way that they undergo a heating process, e.g. during the pressing with a heatable stamp, and dissolve in the resinification. A filament-holding arrangement via random fibers, for instance, is to be built up in the layers in such a way that it does not stand out towards the outside in the finished product to the extent possible, and thus with the adhesive side towards the outside under the last fiber layer as a preference. Different lengths of the individual fibers (random fibers) in a mixture up to a length of a maximum of one centimeter have turned out to be effective; large lengths are not ruled out.

The structural reinforcement elements can be applied via coating, lamination or spraying of the individual layers. If a spray onto the layers is envisaged, the percentage share of fibers of the coating volume during the process of spraying on the structural reinforcement elements can be controlled; a higher percentage of fiber content can thereby be applied in especially stressed areas, for instance, than in other areas that are designed to be purely flat, as an example. The possibility therefore exists to have a targeted effect on the subsequent manufacturing process and to use the structural reinforcement elements anywhere where later draping zones will be exposed to increased stress.

When there is fully automatic production of the 3-dimensional components, there could only be an application from this point of view of the structural reinforcement elements in areas that will subsequently be exposed to increased stress, for instance, whereas the other areas, on the other hand, will not have to be equipped with additional structural reinforcement elements or will have to only be equipped with them to a small extent. The starting material can be appropriately prepared early on as far as this is concerned with knowledge of the later shape of the 3-dimensional component. The possibility consequently exists to arrange for the structural reinforcement elements to be distributed over the entire plane of the individual layers or to only equip selected areas of the layers with structural reinforcement elements. If plastic materials or even carbon fibers are used as structural reinforcement elements, the further possibility exists to provide good adhesive capabilities for further processing of the structural reinforcement elements by electrostatically charging the individual layers, especially in the draping zones. Alternatively, the possibility exists to pretreat the draping zones electrostatically so that the structural reinforcement elements will adhere especially well in these areas. In addition, the possibility also exists, as is already known from the prior art, to sew the individual layers together with one another and, in fact, especially in the area of the draping zones; the positioning of the individual fibers in the scrims will be reinforced once again because of that if the advantages achieved by that are greater than the described drawbacks caused by the sewing.

A further special design form of the invention envisages that the structural reinforcement elements are designed to be self-adhesive or that they develop their adhesive capabilities when they are heated. The possibility absolutely exists here to completely dissolve the structural reinforcement elements with the heating process.

The layers with structural reinforcement elements are preferably thermoplastically workable in connection with this; air permeability is simultaneously retained. The production of 3-dimensional components is made easier because of the thermoplastic workability; the layers and structural reinforcement elements, in particular, can be brought into their final form by pressing them with the application of heat before additional reinforcement is provided with a synthetic resin. To press the layers and structural reinforcement elements, it is especially envisaged here that the layers and structural reinforcement elements will be pressed at low speed in the beginning and with greater speed before the end position is reached; there is only a slight influence on the position of the individual fibers because of that, and interference with the mechanical characteristics can consequently not arise.

The mold and the stamp for pressing could be preheated or heated to the same or to a different temperature in each case over the surface or part of the surface. If the 3-dimensional or sheet-like components have to be adapted to increased stability requirements, the possibility exists to correspondingly increase the number of layers with and without structural reinforcement elements. This always suggests itself when not just high mechanical stability is desired in part, but also an appropriate thickness of the component to be manufactured above and beyond that.

BRIEF DESCRIPTION OF THE DRAWINGS

The invention will be explained in more detail below with the aid of the figures.

DETAILED DESCRIPTION OF THE PREFERRED EMBODIMENT

Figure 1:
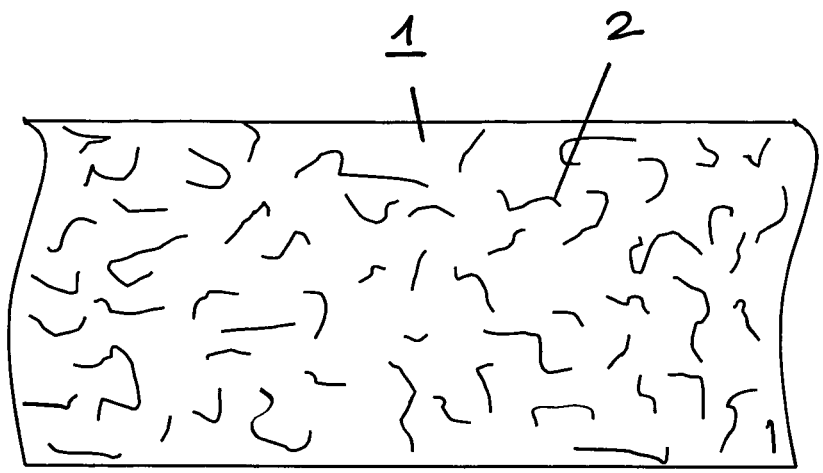
FIG. 1 shows a film with structural reinforcement elements in a top view.

FIG. 1 shows the section of a film 1 that is filled with isotropically distributed structural reinforcement elements 2 in a top view. This film 1 can be used as an adhesive film, for example, to join two or more UD scrims with one another. The possibility exists as far as this is concerned to wind film 1 into the MD scrim in the winding process. At the same time, film 1 serves as a support film for the structural reinforcement elements 2 that are arranged, as is suggested, to be isotropically distributed on film 1. The number of structural reinforcement elements 2 and their size and arrangement can be arbitrarily varied in connection with this.

Figure 2:
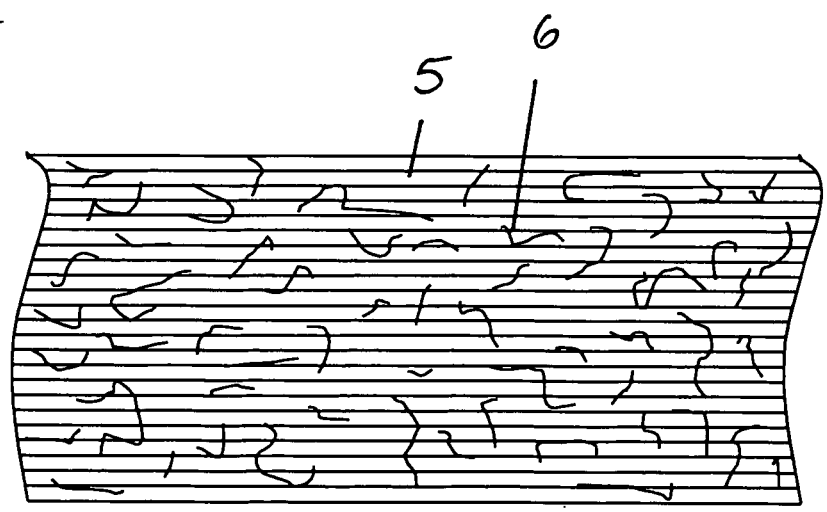
FIG. 2 shows a UD scrim with structural reinforcement elements in a top view.

FIG. 2 shows a UD scrim 5 in a top view that is likewise provided with structural reinforcement elements 6. In this case, the structural reinforcement elements 6 are directly arranged on the UD scrim 5 and are joined with it, for instance via an electrostatic force of attraction or adhesive agents. A UD scrim 5 of that type can be used as a 0° position in the production of MD scrims, for instance, or the UD scrims 5 are wound up with further UD scrims in a suitable way to form an MD scrim. The possibility exists here for all of the UD scrims 5 to be equipped with structural reinforcement elements 6 or only individual UD scrims 5.

Figure 3:
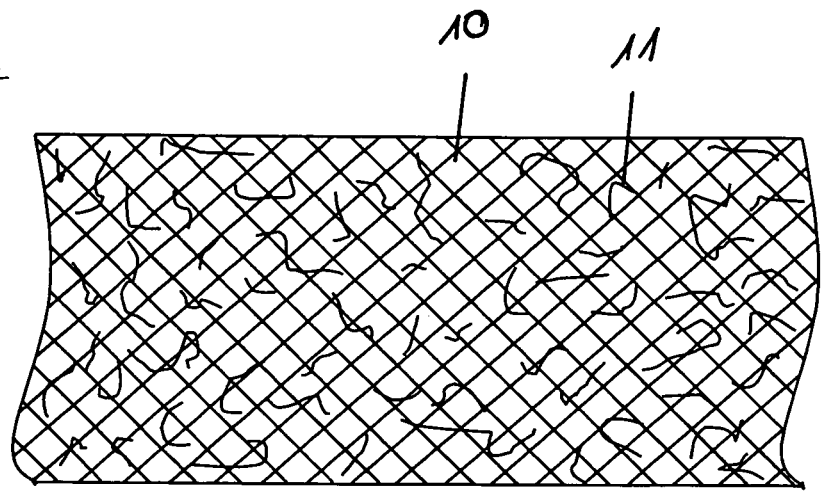
FIG. 3 shows an MD scrim with structural reinforcement elements in a top view.

FIG. 3 shows an MD scrim 10 in a top view that is likewise equipped with structural reinforcement elements 11. In this special design example, the structural reinforcement elements 11 are likewise isotropically distributed on the MD scrim; the structural reinforcement elements 11 can be arranged both between the individual UD layers and on the MD scrim 10. The possibility exists with regard to this, as an example, for a film 1, as previously known from FIG. 1, to be added in between the individual layers of the MD scrim 10, or for individual UD scrims 5 to be used with structural reinforcement elements 6 when the MD scrim 10 is wound. All of the UD scrims 5 that are used could be equipped with structural reinforcement elements 6 in connection with this, or only individual paths of the UD scrims 5 could be equipped with structural reinforcement elements 6.

Figure 4:
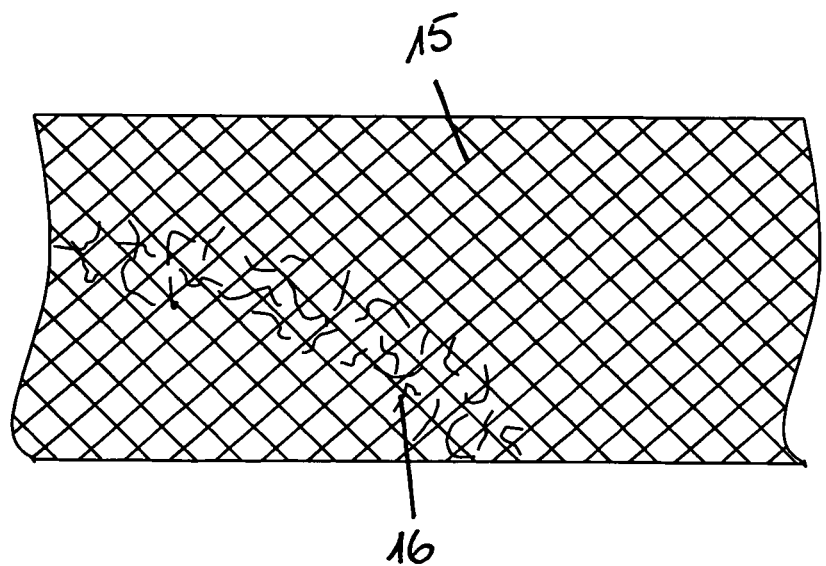
FIG. 4 shows an MD scrim with structural reinforcement elements arranged in certain areas in a top view and FIG. 5 shows the bottom of a boot in a top view as a sample design.

FIG. 4 likewise shows an MD scrim 15 in a top view that has structural reinforcement elements 16. The structural reinforcement elements 16 are only in a portion of the MD scrim 15 in this design example and, in fact, in the area that corresponds to the draping zone, i.e. where an edge area arises after the pressing of the MD scrim 15, as an example, that requires the use of structural reinforcement elements 16.

The above-mentioned design examples can be arbitrarily extended or expanded, or MD scrims 15 with a different arrangement of the structural reinforcement elements 16 can be used, in order to develop corresponding reinforcement zones, for instance, on the top and bottom of the 3-dimensional components to be manufactured.

Figure 5:
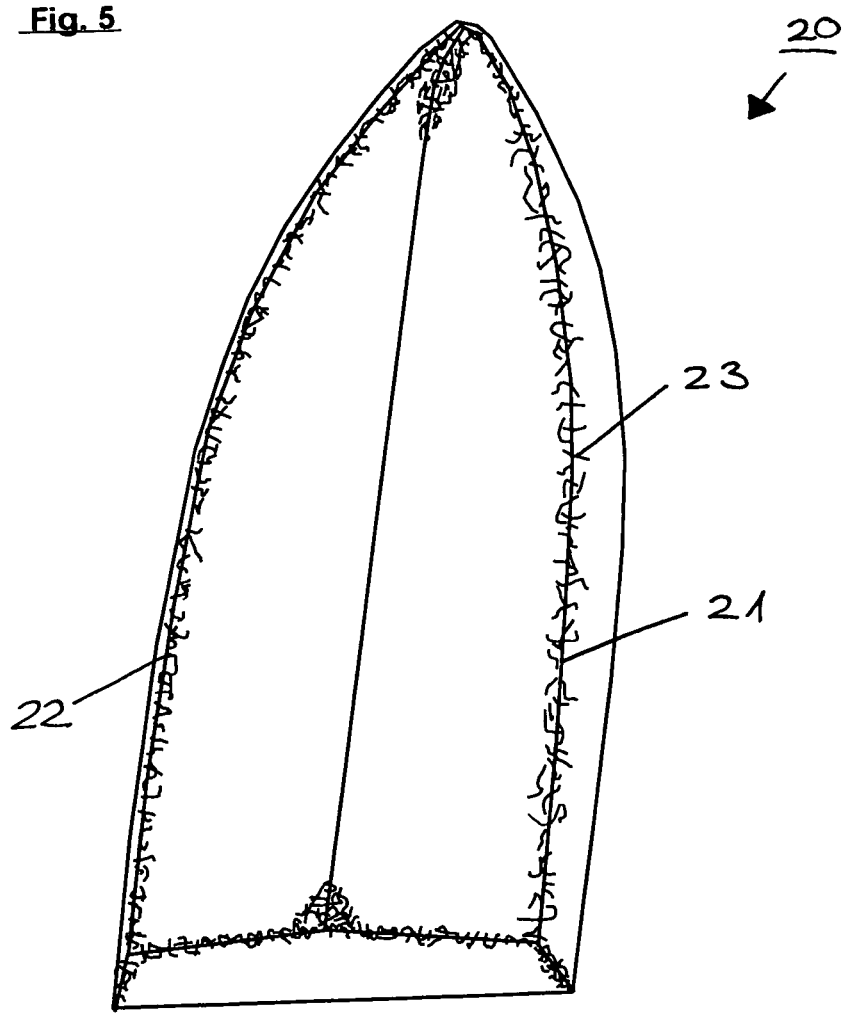

FIG. 5 shows a boot 20 in a bottom view that is made of UD scrims, but especially of MD scrims. The MD scrims are put into a specific form for this purpose, i.e. either by laying or pressing them; the edge areas 21, 22 lead to a strong deformation of the MD scrims. The MD scrims get reinforcement in these draping zones in the form of structural reinforcement elements 23 for this reason, in order to consequently prevent the individual fibers of the UD or MD scrims from being able to fan out in the draping zones. After the scrims have been pressed into the appropriate shape, the shaped scrim is additionally filled out with a synthetic resin so that the entire lower boot body is finished for further follow-up work after it hardens.

The design example illustrates a possible application. The possibility exists without further ado to employ the structural reinforcement elements for high-strength component that can be used in the automotive area, in aeronautics and space travel, in shipbuilding, in wind power systems, in rail vehicles, in container and aircraft construction or mechanical engineering.

LIST OF REFERENCE NUMERALS

1 Film
2 Structural reinforcement element
5 UD scrim
6 Structural reinforcement element
10 MD scrim
11 Structural reinforcement element
15 MD scrim
16 Structural reinforcement element
20 Boat
21 Edge area
22 Edge area
23 Structural reinforcement element

The invention claimed is:

1. Multilayer laid scrim comprising a structure made of several layers of glass fibers, synthetic fibers, aramid fibers and/or carbon fibers,
characterized in that
sprayed-on self-adhesive structural reinforcement elements (2, 6, 11, 16, 23) without orientation exist between at least two layers, wherein there is selective control of the percentage share of fibers in a coating volume so that stressed areas of the multilayer laid scrim have a higher percentage of fiber content,
wherein
the individual layers having draping zones, said draping zones being created at the ends of the individual layers via pressing in an appropriate mold, with structural reinforcement elements arranged in the area of the draping zones.

2. Multilayer laid scrim according to claim 1 characterized in that the structural reinforcement elements (2, 6, 11, 16, 23) are distributed isotropically.

3. Multilayer laid scrim according to claim 1,
characterized in that
the structural reinforcement elements (2, 6, 11, 16, 23) are arranged to be distributed over the entire plane of the individual layers, or that selected areas of the layers are equipped with structural reinforcement elements (2, 6, 11, 16, 23).

4. Multilayer laid scrim according to claim 1, characterized in that the structural reinforcement elements (2, 6, 11, 16, 23) are designed to be straight, curved, wavy or arch-shaped.

5. Multilayer laid scrim according to claim 1, characterized in that the structural reinforcement elements (2, 6, 11, 16, 23) are made of random fibers, random-fiber coatings or random-fiber films.

6. Multilayer laid scrim according to claim 1, characterized in that the structural reinforcement elements (2, 6, 11, 16, 23) can also be applied via coating or lamination of the individual layers.

7. Multilayer laid scrim according to claim 1, characterized in that the structural reinforcement elements (2, 6, 11, 16, 23) adhere via an electrostatic charge on the layers.

8. Multilayer laid scrim according to claim 1, characterized in that the structural reinforcement elements have additional electrostatic adherence to the draping zones because the draping zones are electrostatically pretreated.

9. Multilayer laid scrim according to claim 1, characterized in that follow-up work is done on the draping zones by sewing them.

10. Multilayer laid scrim according to claim 1,
characterized in that
the layers are thermoplastically workable, wherein air permeability is retained.

11. Multilayer laid scrim according to claim 1, characterized in that the layers and structural reinforcement elements (2, 6, 11, 16, 23) can be brought into their final form via pressing while heat is applied.

12. Multilayer laid scrim according to claim 1, characterized in that further structural reinforcement elements are added to layers subject to greater stress than surrounding layers.

* * * * *